Sept. 19, 1972  T. MARKS ET AL  3,692,617
MODULAR TREE USING TAPERED FRAME AND RINGS OF BRANCHES
Filed Aug. 31, 1970  2 Sheets-Sheet 1

INVENTORS
THEODORE MARKS
SI SPIEGEL
BY
Sandoe, Hopgood & Calimafde
ATTORNEYS

INVENTORS
THEODORE MARKS
SI SPIEGEL
BY
*Sandoe, Hopgood & Calimafde*
ATTORNEYS

United States Patent Office 3,692,617
Patented Sept. 19, 1972

3,692,617
MODULAR TREE USING TAPERED FRAME AND RINGS OF BRANCHES
Theodore Marks, Hartsdale, and Si Spiegel, Briarcliff Manor, N.Y., assignors to American Technical Industries, Inc., Mount Vernon, N.Y.
Filed Aug. 31, 1970, Ser. No. 68,319
Int. Cl. A41g *1/00;* A47f *5/04*
U.S. Cl. 161—24
4 Claims

ABSTRACT OF THE DISCLOSURE

A modular tree comprising a frame assembly preferably of wire elements which can be secured together to define a tapering frame. Rings are provided of different diameters to fit over said frame, each ring having a plurality of branch elements secured at points intermediate the branch ends to respective points along the ring. The branches face outwardly and define rows of simulated tree branches.

FIELD OF INVENTION

This invention relates to artificial trees or shrubbery. Primarily, the invention relates to artificial trees having branches formed by bristles or simulated needles held between a pair of twisted wires.

BACKGROUND OF INVENTION

Artificial trees which have received substantial acceptance have utilized a pole construction into which radially extending branches of twisted wire are inserted. The pole is utilized as an attempt to simulate a natural tree trunk.

In artificial trees, however, this construction presents substantial problems in terms of manufacturing cost, transportation, storage and assembly problems. Here, the pole has to be formed, cut to size and special pole drilling equipment used. The pole must be predrilled to provide an accurate number of holes to receive the branches. This operation requires several manual steps by an operator as well as the expenditures of substantial sums for special drilling equipment. Further, different size branches must be made to simulate the gradual taper of the natural tree and the branches must be inserted in the tree in the preselected pole positions.

One important problem area associated with this type of tree as well as other types of trees including artificial shrubs relates to transportation and storage. The tree is a bulky item and the business is essentially seasonal. Thus, the trees must be made throughout the year and many must be placed in storage for delivery close to the Christmas season. The tree size or bulk (when multiplied by the thousands or more) thus presents severe handling and storage problems and substantial expense incident to such problems.

Other frame constructions particularly for shrubs have been used which have hollowed interiors. Such frames do not eliminate the bulk problem and have the branch elements directly fastened to the frame. These shrubs are primarily intended for permanent, year round use and their physical characteristics are different reflecting the different use intended.

OBJECTS AND ADVANTAGES

One of the objects of the invention is to provide a novel construction of an artificial tree which is easily assembled and disassembled and uses removable rings having branches attached thereto. The rings are then dropped onto or picked up from a tapered frame.

A further object is to provide a modular, easily assembled and disassembled tree frame for the branch rings.

Yet another object is to provide an artificial tree in which the frame is easily packaged and assembled and in which the branch-rings are of different diameters and can be compactly packaged with some or all of the rings fitting within the circumference of other rings.

A still further object of this invention is to provide an artificial tree construction in which the branches are utilized in presenting maximum tree appearance. More apparent coverage per pound of bristle is obtained as the center of the tree is hollow. This reduces the cost and weight of the tree.

Yet another object of this invention is to provide an artificial tree which is economical and easy to manufacture by using branch lengths of the same size substantially throughout the tree. By using the ring-branch construction in which the rings vary in diameter, the branches affixed to each ring may be constant in length. This eliminates the requirement of using different branch lengths in positions of the tree progressing from the base to the top and facilitates manufacturing by using a uniform size branch.

A still further object is to provide a modularized ring-branch artificial tree, using wire frame elements and a stable tubular stand using wire legs having pluggable midsections, the stand having aligning means for the wire frame elements. This combination of elements is very easy to transport, assemble and disassemble. The consumer may easily store the entire tree away for next season with a minimum of inconvenience and utilization of storage space.

SUMMARY OF INVENTION

Briefly, this invention includes a frame and a series of ring-branches attached to the frame to simulate the appearance of a tree or shrub. Each ring-branch comprises a ring and a series of branch elements of twisted wire holding bristles therebetween. Each branch is bent over upon itself to present two branch ends, which form one in a row of similar branch ends. The branch is permanently attached to the ring at a point intermediate the branch ends.

The above-mentioned and other features and objects of this invention and the manner of attaining them will become more apparent and the invention itself will be best understood by reference to the following description of an embodiment of the invention taken in conjunction with the accompanying drawings.

DETAILED DESCRIPTION OF PREFERRED EMBODIMENT

Figures 1, 1A:
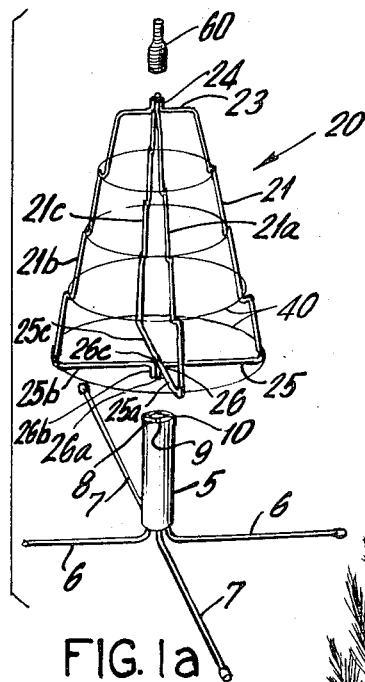
FIG. 1 is a front view, partially broken away illustrating the frame and branches of the tree of this invention.
FIG. 1a is an exploded view of the frame itself.
Figure 2:
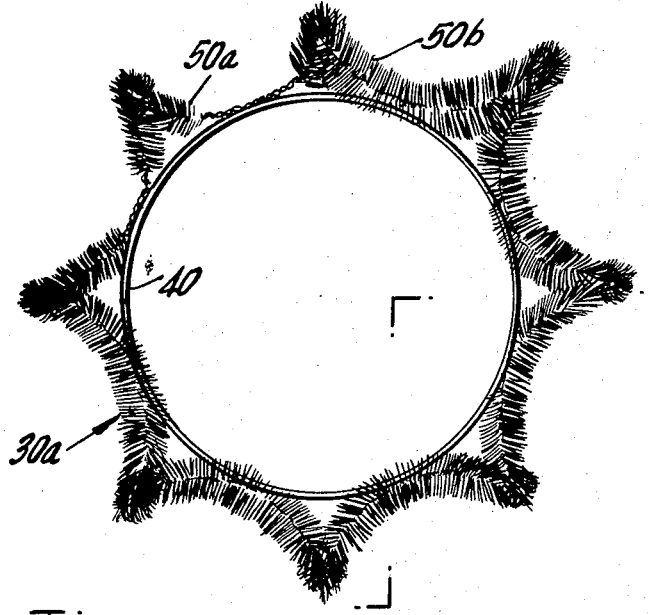
FIG. 2 is a top view of a single ring-branch element.

Referring now to FIGS. 1, 1a and 2, there is shown the tree 1 of this invention. The frame 20 tapers outwardly from top to bottom and rests in and is supported in a stand. For the preferred and novel embodiment of this invention, there is shown wire frame elements 21, 21a, 21b, 21c, each being identical. The wire elements comprise a tapering side, an upper section comprising a vertical top 24 and a horizontal bend 23 if desired. The base section comprises a horizontal bend 25 and vertical ends 26.

The wire frame fits into and is supported by a stand. This stand is described in more detail in copending application S.N. 71,663 entitled "Tree Stand" filed Sept. 14, 1970, by Spiegel and owned by the assignee of this application, the contents of which are deemed to be incorporated by reference. Briefly, this stand comprises a tube 5 and legs 6, 7 formed of straight wire. Each leg is straight and makes contact with the ground along the length thereof, except for bent midsections which form a plug for insertion and reinforcement of the tube. The midsections are comprised of parallel sides of unequal lengths connected by a bridging section. The top of the stand includes a block 8 fastened to the tube and having orthogonal grooves 9, 10 to receive, align and support the horizontal sections 25, 25a, 25b, 25c of the frame elements. The block also includes a vertical aperture to receive the vertical ends 26, 26a, 26b, 26c.

A cap 60, preferably a coil spring having open ends receives the vertical ends 24 and also provides a receptacle for the top tree branches 61. Branch 61 is insertable and is otherwise conventional.

The ring branches 30a, 30b, . . . are formed of rings 40 (FIG. 2). By the word "ring," there is included an endless or substatially endless element having an effective diameter which can fit onto the periphery of a frame. The ring may be made of wire, plastic, cardboard or any other material, nad may be made as a unitary construction, or in sections, or can be hinged together, or in other ways which will be apparent to those skilled in the art.

The branch elements 50a, 50b, . . . are preferably made of twisted wire having needle like elements such as bristles held in place between the wires.

As ilustrated in FIG. 2, the branches 50a, 50b, are secured to the ring 40 along spaced points or sections of the ring along the ring circumference. The branches are fastened at points or sections thereof intermediate the branch ends, so that the branches can be bent upwardly and outwardly (FIGS. 2, 2a) to present a row of branch elements and give the tree the desired appearance. The branches may be secured in any desired manner, such as by stapling, winding, tying, welding or by other means. While in the preferred embodiment the branches are secured intermediate their ends, some of the branches, if desired may be secured close to, or at their very ends. So long as the ring-branch principle is employed, such construction and securing of the branches to the rings is within the principles disclosed here.

Figure 2A:
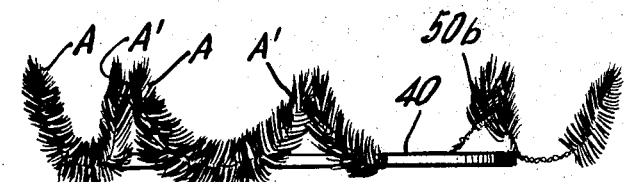
FIG. 2a is a side view along the line 2a—2a of FIG. 2.
Figure 4:
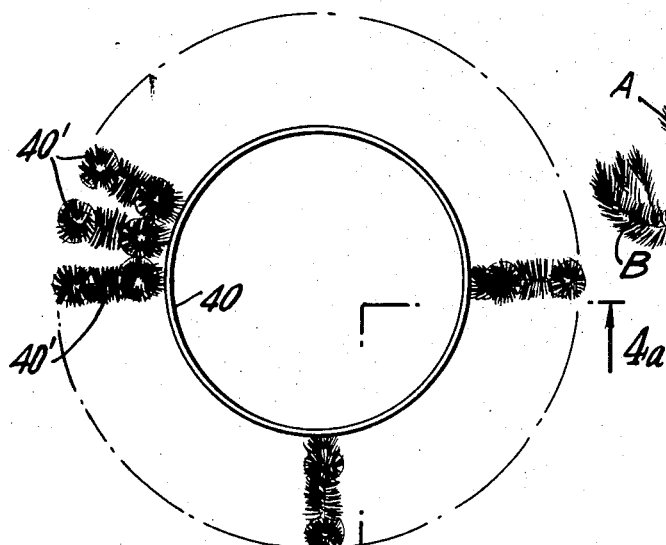
FIG. 4 is a top view of an alternate ring-branch construction.
Figure 4A:
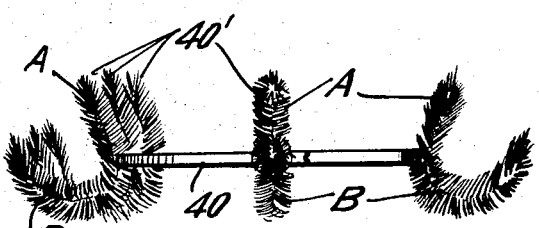
FIG. 4a is a side view along the lines 4a—4a of FIG. 4.

In FIGS. 4 and 4a, the branches 40' are arranged with the twisted wires in a vertical plane, or at least at an angle to horizontal, and each end A, B occupies a position in a different row, respectively A, or B. In FIGS. 2, 2a, each branch end A, A' occupied a position in the same row A. In the embodiments of FIGS. 2 and 4, the branches of adjacent rows are essentially symmetrical and blend together so as to effectively conceal the frame. Respective rows may be rotated somewhat, or the spacing of branches may be varied from ring to ring, or spaced non-uniformly to provide fuller concealment of the frame.

OTHER EMBODIMENTS

It is within the principles of this invention to use different forms of tapering frames or frames of different diameters.

If a shrub of somewhat spherical shape is desired, the ring-branches can be applied from the top and bottom of the frame and held in place by securing means, such as clips, or bracket elements on the frame. When the rings are hinged or made of sections, any desired shape can be given to the tree or shrub.

Other types of frames may include conical deevlopment surfaces, or interconnected triangularly shaped cardboard or flat sections, or radial wires extending from a central pole, the length of the wires varying from the top of the tree to the bottom.

Figure 3:
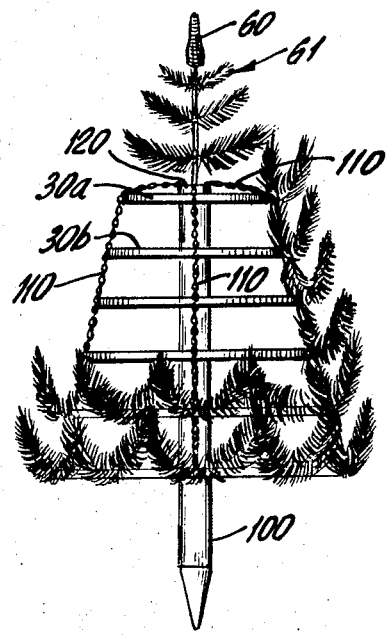
FIG. 3 is a schematic side view of another tree embodiment.

Another frame embodiment using a central pole element is shown in FIG. 3. Here a conventional pole 100 has a tree top 60 inserted therein in the conventional manner. A series of rings 30a, 30b, are held in place by one or more flexible elements 110, such as a cord or chain which is anchored to a cap 120 at the top of the pole and are secured to the flexible element along lengths thereof.

It is within the principle of the invention to use notches or grooves formed in the wire elements of FIG. 1 to receive the rings or to use such notches or grooves in a cardboard frame or other embodiments.

While the foregoing description sets forth the principles of the invention in connection with specific apparatus, it is to be understood that this description is made only by way of example and not as a limitation of the scope of the invention as set forth in the objects thereof and in the accompanying claims.

What is claimed is:

1. An artificial tree comprising: a frame tapering outwardly from top to bottom and including a plurality of separate wire elements having upper and lower ends and shaped to provide the frame taper, the lower end of each of said wire elements having an inwardly extending, substantially horizontal section, and a downwardly extending section extending from said horizontal section; a series of ring elements of different diameters; each of said ring elements having a plurality of artificial branches secured thereto; said ring elements being positioned on said frame at different positions along the length of the frame to thereby substantially cover said frame, cap means for coupling the upper ends of said wire elements, and stand means for receiving the downwardly extending sections of said wire elements and for thereby supporting said frame.

2. The artificial tree of claim 1 in which branches are secured to the ring at a point of said branch intermediate the ends thereof, and the ends of the branches curve upwardly.

3. The tree of claim 1 in which said stand means includes a tubular support and pluggable wire legs therefor, said support including a member having a vertical aperture to receive the vertically, and downwardly inclined wire element ends, said member also having radial grooves which terminate in said vertical aperture to receive, guide, and align the respective horizontal sections of said wire elements.

4. The tree of claim 1 in which said cap means comprises an elongated coil spring open at each end, the bottom end receiving the top ends of the wire frame elements, the upper end of the spring being adapted to receive depending ends of a branched tree top.

References Cited

UNITED STATES PATENTS

| 1,654,427 | 12/1927 | Modlarz | 211—178 R |
| 3,343,357 | 9/1967 | Goodridge | 57—24 |
| 2,864,192 | 12/1958 | Shoalts | 161—22 X |
| 2,731,752 | 1/1956 | Erickson et al. | 161—22 X |
| 2,774,165 | 12/1956 | Smith | 161—24 |
| 1,590,220 | 6/1926 | Wurts | 211—178 R |
| 3,647,605 | 3/1972 | Spiegel | 161—31 |

PHILIP DIER, Primary Examiner

U.S. Cl. X.R.

161—31; 211—178

UNITED STATES PATENT OFFICE
CERTIFICATE OF CORRECTION

Patent No. 3,692,617   Dated September 19, 1972

Inventor(s) Theodore Marks, Hartsdale, and Si Spiegel

It is certified that error appears in the above-identified patent and that said Letters Patent are hereby corrected as shown below:

Column 4, Claim 2, line 39, "the ring" should have been --said ring elements--;

"of said branch" should not appear.

Signed and sealed this 13th day of February 1973.

(SEAL)
Attest:

EDWARD M. FLETCHER, JR.
Attesting Officer

ROBERT GOTTSCHALK
Commissioner of Patents